US009210071B2

(12) United States Patent
Allan et al.

(10) Patent No.: US 9,210,071 B2
(45) Date of Patent: Dec. 8, 2015

(54) AUTOMATED TRAFFIC ENGINEERING FOR FAT TREE NETWORKS

(75) Inventors: David I. Allan, Ottawa (CA); Scott A. Mansfield, Evans City, PA (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 328 days.

(21) Appl. No.: 12/983,009

(22) Filed: Dec. 31, 2010

(65) Prior Publication Data
US 2012/0039161 A1   Feb. 16, 2012

Related U.S. Application Data

(60) Provisional application No. 61/373,928, filed on Aug. 16, 2010.

(51) Int. Cl.
| H04L 12/28 | (2006.01) |
| H04L 12/729 | (2013.01) |
| H04L 12/703 | (2013.01) |
| H04L 12/721 | (2013.01) |
| H04L 12/753 | (2013.01) |
| H04L 12/803 | (2013.01) |
| H04L 12/707 | (2013.01) |

(52) U.S. Cl.
CPC .............. *H04L 45/125* (2013.01); *H04L 45/06* (2013.01); *H04L 45/28* (2013.01); *H04L 45/48* (2013.01); *H04L 47/125* (2013.01); *H04L 45/22* (2013.01)

(58) Field of Classification Search
None
See application file for complete search history.

(56) References Cited

U.S. PATENT DOCUMENTS

| 6,084,858 | A | 7/2000 | Matthews et al. |
| 7,911,944 | B2 | 3/2011 | Chiabaut et al. |
| 8,248,925 | B2 * | 8/2012 | Allan et al. ................... 370/229 |
| 8,509,618 | B2 | 8/2013 | Boertjes et al. |
| 2007/0002770 | A1 * | 1/2007 | Haalen et al. ................ 370/256 |
| 2007/0177527 | A1 * | 8/2007 | Bragg et al. .................. 370/256 |
| 2009/0168768 | A1 | 7/2009 | Chiabaut et al. |
| 2010/0020797 | A1 | 1/2010 | Casey et al. |
| 2010/0182934 | A1 * | 7/2010 | Dobbins et al. ............... 370/254 |

(Continued)

FOREIGN PATENT DOCUMENTS

WO   WO-2010/104434   9/2010
(A1)

OTHER PUBLICATIONS

David Allan et al., "Provider Link State Bridging", Sep. 1, 2008, 8 pages, IEEE Communications Magazine, vol. 46, No. 9.

(Continued)

*Primary Examiner* — Chirag Shah
*Assistant Examiner* — Amar Persaud
(74) *Attorney, Agent, or Firm* — Nicholson De Vos Webster & Elliott LLP

(57) ABSTRACT

Embodiments of a method implemented in at least one fat tree network node for improved load distribution, wherein the node is one of a plurality of fat tree network nodes in a fat tree network each of which implement a tie-breaking process to produce minimum cost trees, is described. In some embodiments, a spanning tree computation for each root node of the fat tree network in order from a lowest ranked root node to a highest ranked node is performed, a filtering database for each root node of the fat tree network, wherein the filtering database includes a set of media access control (MAC) addresses of the leaf nodes of the fat tree network generated, and link utilization for each computed tree to use as a prefix to link identifiers used for at least one tie-breaking algorithm added.

14 Claims, 10 Drawing Sheets

(56) References Cited

U.S. PATENT DOCUMENTS

| | | |
|---|---|---|
| 2011/0026438 A1* | 2/2011 | Farkas et al. .................. 370/256 |
| 2011/0060844 A1 | 3/2011 | Allan et al. |
| 2011/0128857 A1 | 6/2011 | Chiabaut et al. |
| 2011/0273980 A1 | 11/2011 | Ashwood Smith |
| 2012/0057603 A1 | 3/2012 | Allan et al. |
| 2012/0063465 A1 | 3/2012 | Keesara et al. |
| 2012/0281524 A1 | 11/2012 | Farkas |
| 2012/0307832 A1 | 12/2012 | Allan et al. |
| 2013/0080602 A1 | 3/2013 | Keesara et al. |

OTHER PUBLICATIONS

Non-Final Office Action, U.S. Appl. No. 13/458,675, dated Dec. 23, 2013, 11 pages.

"IEEE Std 802.1Qay-2009, IEEE Standard for Local and metropolitan area networks—Virtual Bridged Local Area Networks, Amendment 10: Provider Backbone Bridge Traffic Engineering," Aug. 5, 2009, 145 pages, IEEE, New York, New York, downloaded from http://standards.ieee.org/getieee802/download/802.1Qay-2009.pdf.

David Allan et al., "IEEE 802.1aq in a Nutshell: Antecedents and Technology," 2012, 35 pages, 802.1aq Shortest Path Bridging Design and Evolution: The Architect's Perspective, First Edition, Chapter 1, 2012 the Institute of Electrical and Electronics Engineers, John Wiley & Sons, Inc.

David Allan et al., "Shortest Path Bridging: Efficient Control of Larger Ethernet Networks," Oct. 2010, 8 pages, IEEE Communications Magazine.

Peter Ashwood-Smith, "Shortest Path Bridging IEEE 802.1aq Tutorial and Demo," Oct. 2010, 61 pages, downloaded from http://www.nanog.org/meetings/nanog50/presentations/Sunday/IEEE_8021aqShortest_Path.pdf.

D. Fedyk et al., "IS-IS Extensions Supporting IEEE 802.1aq Shortest Path Bridging, draft-ietf-isis-ieee-aq-05.txt," Mar. 8, 2011, 41 pages, Network Working Group, Internet Draft, IETF Trust, downloaded from http://tools.ietf.org/html/draft-ietf-isis-ieee-aq-05.

"Draft Standard for Local and Metropolitan Area Networks—Media Access Control (MAC) Bridges and Virtual Bridged Local Area Networks—Amendment 8: Shortest Path Bridging", IEEE P802.1aq/D4.5, Feb. 6, 2012, 359 pages.

Non-Final Office Action, U.S. Appl. No. 13/452,780, dated May 7, 2014, 19 pages.

Notice of Allowance, U.S. Appl. No. 13/458,675, dated May 29, 2014, 6 pages.

Notice of Allowance, U.S. Appl. No. 13/452,780, dated Nov. 7, 2014, 10 pages.

* cited by examiner

AUTOMATED TRAFFIC ENGINEERING FOR FAT TREE NETWORKS

PRIORITY

This application claims priority from U.S. Provisional Application No. 61/373,928, filed Aug. 16, 2010, entitled, "Algorithms and Automated Traffic Engineering To Apply 802.1aq to Fat Tree Networks."

FIELD OF THE INVENTION

The embodiments of the invention relate to a method and apparatus for improving load distribution in a network. Specifically, the embodiments of the invention relate to a method for load spreading in fat tree networks or other highly regular switching hierarchies that have multiple equal cost paths between nodes in the network.

BACKGROUND

Load distribution or load spreading is a method by which bandwidth is more effectively utilized and overall performance is improved in a network. Most automated load distribution and load spreading techniques deployed today operate with only a very local view, these load distribution and load spreading techniques only consider the number of next hops on the shortest path to a given destination and do not consider the overall distribution of traffic in the network.

Equal cost multi-path (ECMP) is a common strategy for load spreading of unicast traffic in routed networks that can be utilized where the decision as to how to forward a packet to a given destination can resolve to any of multiple "equal cost" next hops, which tied for being on the shortest path when running database calculations. ECMP can be used in conjunction with most unicast routing protocols and nodes equipped with the required supporting data plane hardware. It relies on a per hop decision that is local to a single router and assumes promiscuous receipt and a complete forwarding table at every intermediate node. Using ECMP at any given node in a network, the load is divided pseudo-evenly across the set of equal cost next hops. This process is implemented independently at each hop of the network where more than one path to a given destination exists.

In many implementations, when the presence of multiple equal cost next hops is encountered, each packet is inspected for a source of entropy such as an Internet Protocol (IP) header and a hash of header information modulo of the number of paths is used to select the next hop for the particular packet and will select the same next hop for all packets in a given "flow". For highly aggregated traffic, this method will on average distribute the load evenly in regular topologies (i.e., symmetric topologies) and does offer some improvement in less regular topologies.

Current approaches to data center design utilize what are known as Clos or "Fat Tree" networks. These networks are highly regular and are noted for utilizing arrays of switching nodes combined with very dense meshing in order to scale bandwidth. One of the complications of load spreading on a fat tree network is that the number of paths increases as the square of the connectedness. ECMP can be a good fit in such applications but ECMP based load spreading is dependent on the symmetric regularity of the switching hierarchy to achieve efficiency and near perfect re-randomization of flow to next hop assignment at each hop. A further complication with ECMP is that it cannot be applied to Ethernet without separating the treatment of multicast from unicast as per hop ECMP cannot be applied to multicast traffic. The net result of this is that race conditions can exist between unicast forwarding and the multicast flooding of unknown packets such that out of order delivery can occur in a stable network. Therefore it is desirable to find an alternative to ECMP for Ethernet that is applicable to highly meshed regular networks and where degradation of the traffic distribution is minimized by failures in the network.

SUMMARY

Embodiments of a method implemented in at least one fat tree network node for improved load distribution, wherein the node is one of a plurality of fat tree network nodes in a fat tree network each of which implement a tie-breaking process to produce minimum cost trees, the method comprising the steps of: performing a spanning tree computation for each root node of the fat tree network in order from a lowest ranked root node to a highest ranked node; generating a filtering database for each root node of the fat tree network, wherein the filtering database includes a set of media access control (MAC) addresses of the leaf nodes of the fat tree network; and adding link utilization for each computed tree to use as a prefix to link identifiers used for at least one tie-breaking algorithm.

Embodiments of a method in an edge node for improved load distribution in an fat tree network that includes the edge node, wherein the edge node is one of a plurality of edge nodes in the fat tree network each of which implement a common algorithm tie-breaking process to produce minimum cost spanning trees, the edge node includes a database to store the topology of the fat tree network, wherein the topology of the fat tree network includes a plurality of nodes and links between the nodes, the method comprising the steps of: determining a first set of one or more shortest paths between each edge node pair in the fat tree network by executing a shortest path search algorithm on the topology of the fat tree network stored in the database; selecting at least a first shortest path from the first set of shortest paths for each edge node pair, by applying the common algorithm tie-breaking process; calculating a link utilization value for each link of the fat tree network based on the count of shortest paths selected that transit each link; determining a second set of one or more shortest paths between each edge node pair and roots of the fat tree network by executing the shortest path search algorithm on the topology of the fat tree network stored in the database; generating a path utilization value for each shortest path in the second set of one or more shortest paths based on link utilization values corresponding to each shortest path; selecting a second shortest path from the second set of one or more shortest path on the basis of said path utilization value, wherein the selecting utilizes the common algorithm tie-breaking process when multiple shortest paths having equal path utilization values are present in the set of one or more shortest paths; and storing at least the first shortest path for each edge node pair in a filtering database, wherein the filtering database indicates where to forward traffic incoming to the edge node.

Embodiments of an edge node for improved load distribution in an fat tree network that includes the edge node, wherein the edge node is one of a plurality of edge nodes in the fat tree network, wherein a topology of the fat tree network includes a plurality of nodes and links between the nodes, the edge node comprising: a topology database to store link information for each link in the fat tree network; a filtering database to store filtering information for each port of the edge node, wherein the filtering database indicates where to forward traffic incoming to the edge node; a control processor coupled to the topology database and the filtering database, the control processor configured to process data traffic, wherein the control processor comprises: a shortest path search module configured to determine at least one shortest path between each edge node pair in the fat tree network by executing a shortest path search algorithm on the topology database, wherein the shortest path search module is configured to send, for each of the edge node pairs with a plurality of equal cost shortest paths, the equal costs shortest paths to a load distribution module; a sorting module configured to rank each of the plurality of equal cost shortest paths based on a path utilization value derived from link utilization values associated with each path in the plurality of equal cost shortest paths; and the load distribution module configured to select, from the plurality of equal cost shortest paths, a first subset of the plurality of equal cost shortest paths for that edge node and roots to be used to share data traffic load between the edge node pair and to select, based on the path utilization value, a second subset from the plurality of equal cost shortest paths for that edge node and root to be used to share data traffic load with the first subset.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

Figure 1:
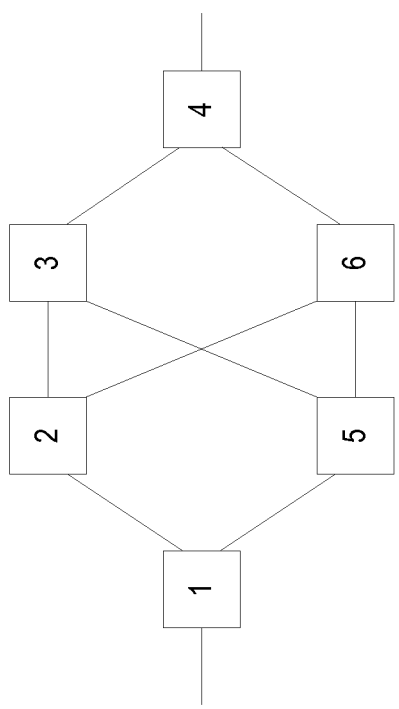
FIG. 1 is a diagram of an example of a network topology.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The embodiments include a basic tie-breaking process with specific properties including the properties that the process will always resolve to a single path, is independent of the order or direction of computation, and has a locality property such that a tie for any portion of the considered path can be resolved without having to consider the entire path.

The techniques shown in the described figures may be implemented using code and/or data stored and executed on one or more electronic devices (e.g., an end station, a network element, etc.). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data, voice, and video). Subscriber end stations (e.g., servers, workstations, laptops, palm tops, mobile phones, smart phones, multimedia phones, Voice Over Internet Protocol (VOIP) phones, portable media players, GPS units, gaming systems, set-top boxes (STBs), etc.) access content/services provided over the Internet and/or content/services provided on virtual private networks (VPNs) overlaid on the Internet. The content and/or services are typically provided by one or more end stations (e.g., server end stations) belonging to a service or content provider or end stations participating in a peer to peer service, and may include public web pages (free content, store fronts, search services, etc.), private web pages (e.g., username/password accessed web pages providing email services, etc.), corporate networks over VPNs, IPTV, etc. Typically, subscriber end stations are coupled (e.g., through customer premise equipment coupled to an access network (wired or wirelessly) to edge network elements, which are coupled (e.g., through one or more core network elements to other edge network elements) to other end stations (e.g., server end stations).

The embodiments of the present invention provide a system, network and method for avoiding the disadvantages of the prior art of applying existing packet control planes to these classes of networks including: the utilization of generalized spanning tree as specified by the Institute of Electrical and Electronics Engineers (I4) in isolation strands significant capacity, the use of multiple spanning trees will unevenly use capacity due to the independent nature of path selection during spanning tree construction, shortest path routing combined with equal cost multipath will work well as long as there is no asymmetry (hence is impacted by any network failures in a symmetric network) but will not preserve ordering guarantees for bridged traffic and cannot guarantee fate sharing between Ethernet OAM frames and unicast traffic, applying the algorithms specified in the current I4 802.1aq specification to a fat tree network will not evenly distribute traffic across all links, and the application of the load spreading algorithms described here in to shortest path forwarding for a fat tree network will result in orders of magnitude more computation than is actually necessary.

The embodiments detailed herein overcome these disadvantages by enabling dynamic traffic engineering, such as network aware load spreading, by tracking path placement and consequences of tie breaking across multiple passes of the topology database while simplifying the traversals of the topology database for a network.

The load distribution process is dependent upon prior art in the form of a tie-breaking algorithm with distinct properties such that for a path between any two points it will resolve to a single symmetric path regardless of the direction of computing, order of computing or examination of any subset of the path, a property described as "any portion of the shortest path is also the shortest path." Or stated another way, where a tie occurs along any portion of the shortest path, those nodes will resolve the tie for the subset of the path with the same choice, the result being a minimum cost shortest path tree. This is referred to herein as the "common algorithm tie-breaking" process.

Ethernet allows for the definition of multiple forwarding topologies via the use of VLANs. This permits the use of multiple computed spanning trees with pinned roots, each associated with a VLAN, made diverse using the load spreading algorithm described below. This is employed to address highly regular switching architectures. The pinning of the roots combined with the load spreading algorithm applied to the generation of the spanning trees should produce a "perfect" load distribution resulting in substantially reduced computation in proportion to the number of trees generated.

If the pinned root for a given spanning tree is determined to have failed, or has incomplete connectivity determined by an adjacency failure, or the shortest path tree is found to transit one of the other pinned routes indicating multiple failures in the switching hierarchy rendering the root as non-optimal connectivity, then an "all pairs" computation (where every edge device is a root) is made for that particular connectivity instance (VLAN) while still applying the load spreading algorithm for tie breaking such that the most idle paths are still sought. This is much more computationally intensive than that for a fault free network, but avoids the delays associated with electing a new root that will have optimum connectivity, and the paths selected emanating from the root will not seriously degrade the overall network performance.

In the load distribution process, an initial pass of the topology database utilizing the common algorithm tie-breaking process results in the generation of the first set of trees. This is because no load on any link has been recorded, hence all equal cost paths will be tied for utilization where the definition of equal cost is the combination of lowest metric and lowest number of hops. The initial step requires the determination of the shortest path between each of the node pairs in the network (or in the case of a spanning tree, between each node and the root) and where more than one shortest path between any two nodes (or node and root) is found the common algorithm tie-breaking process is utilized for tie-breaking in order to generate a unique path selection between each of the node pairs in the network which upon completion of considering all nodes generates one or more complete sets of equal cost forwarding trees.

In some embodiments, the fat tree network applies a modified I4 802.1aq approach. I4 802.1aq has two possible modes of operation. A first mode that is for VLAN based networks is referred to as shortest path bridging VID (SPBV). A second mode for MAC based networks is referred to as shortest path bridging MAC (SPBM). Each ECT set is commonly associated with a number of shortest path VLAN identifiers (SPVIDs) forming an SPVID set for SPBV and with a backbone VLAN identifier (B-VID) for SPBM. Both SPBV and SPBM networks can support more than one ECT set simultaneously in the dataplane.

Some embodiments of the tie breaking process utilize ranking of the equal cost paths and therefore are capable of selecting more than one path from such a ranking.

When path selection tie breaking is augmented to consider load, the path selection process also records the number of shortest paths that traverse each link on the basis of paths actually selected by previous tie breaking procedures as an input to subsequent tie breaking. This value is referred to as the "link utilization" value, which can be used to in subsequent computation. The link utilization values can be the count of node pairs whose shortest path transits the link. In other embodiments, more sophisticated possibilities exist to be used in place of link utilization considering additional information in the topology database.

In subsequent passes through the database to generate further sets of paths or trees, the set of shortest paths between any two nodes is first ranked by generating path utilization values that can include the lexicographically sorted link utilization values for each of the paths or simply the sum of the utilization of each link in the path and then ranking the resulting paths based on the path utilization values.

Additional passes or iterations through the topology database are performed (one per root) and in each iteration, the link utilization value assigned to each link in a path is the cumulative measure or indication of shortest paths that transit the link selected during all the previous passes through the topology database.

FIG. 1 is a diagram of one embodiment of an example network topology. The example network topology includes six nodes with corresponding node identifiers 1-6. No path pairs have been determined for the network topology. An exemplary common algorithm tie-breaking process is utilized that ranks the paths lexicographically using the node identifiers. Examining the set of paths of equal cost between node 1 and node 4 will generate the following ranked set of path identifiers (note the path identifiers have been lexicographically sorted such that the node identifiers do not appear as a transit list):

1-2-3-4
1-2-4-6
1-3-4-5
1-4-5-6

In an embodiment where the lowest ranked path is selected, this initial application of the tie-breaking process will select 1-2-3-4 as the low ranked path between these nodes. For simplicity in this example, only node pair 1 and 4 are considered in determining the path count for the network rather than the shortest path trees from all six nodes. In this example, the links in the selected links paths are each then assigned a path pair count of 1. For the next pass through the topology database the load distribution process would yield the following lexicographic sort of link loading associated with each of the path IDs.

Load 0,1,1 for path 1-2-4-6
Load 0,1,1 for path 1-3-4-5
Load 1,1,1 for path 1-2-3-4
Load 1,1,1 for path 1-4-5-6

The lexicographic sorting of link loads will result in a tie for paths 1-2-4-6 and 1-3-4-5, as each is 0-1-1. Similarly the sum of link loads will yield:

Load 2 for path 1-2-4-6
Load 2 for path 1-3-4-5
Load 3 for path 1-2-3-4
Load 3 for path 1-4-5-6

As a result for both ranking styles, the secondary tiebreaker of the lexicographically sorted path IDs is employed. In both cases from this secondary tie-breaker the low path (1-2-4-6) is selected.

Whereas the example only considered the link utilization from examining one path pair, one of ordinary skill in the art would understand that after a single pass of the database, a comprehensive view of the potential traffic distribution exists and that the tie-breaking of subsequent passes will inherently avoid the maxima and therefore the load is distributed across the network more evenly. The degree of modification of load distribution proportionately diminishes with each new set of paths considered as the effect is cumulative.

In the above examples, two techniques of ranking path load were described that would produce consistent results applied across a network. In other embodiments, additional or substitute methods of ranking could be utilized. For example, other mechanisms of ranking load that also have a locality property (any portion of the lowest loaded path is also the lowest loaded path when combined with the common algorithm tie-breaking process) and combinations of such rankings can be utilized.

Further, in the above example, link utilization is represented by the count of shortest paths that transited a link. It is possible to utilize numerous variations for representing link utilization of with greater detail and increased accuracy. Within the filtering and topology databases there is sufficient information such that each node in the network can determine the number of service instances that use a particular shortest path. A link utilization value can be determined based on this utilization to weight the corresponding link appropriately. By increasing the data stored by the filtering or topology database, additional bandwidth profiling information per service is available for use in load distribution calculations. In another embodiment, only the minimum link metrics of the set of links in a path is utilized as representative of the maximum load that could be offered between that pair of nodes. In other embodiments, similar metrics or more detailed metrics can be utilized.

While an "all-pairs" computation is resource intensive, and this approach seeks to minimize or eliminate the need for all-pairs in a fault free network, it may be possible to know that more than one all pairs computation is required, for example in the case of multiple root failures. An optimization may be performed in this case in that the last pass through the database can be optimized as an update to the network loading model is not required as there will be no further passes through the database. In one embodiment, all but the final pass of the topology database involves an "all pairs" computation of the shortest paths between all node pairs in the network. This can be computationally expensive due to the complexity. The load distribution process however, does not require a significant number of passes through the topology database in order to yield measurable benefits and as a result the load distribution process provides valuable overall improvements in network resource allocation that justify these "all pairs" computations.

Because the method is effectively connection oriented, and seeks out the least loaded links, any perturbation of the traffic matrix caused by a failure tends to be isolated and local in nature. The load distribution process will tend to steer data traffic back into the original distribution once a constriction in the network has been bypassed.

The load balancing process and system also enables an administrator to "pre-bias" a link with a load factor which will have the effect of shifting some load away from the particular link. This permits subtler gradations for manipulating routing behavior than simple metric modification, much simpler administration than multi-topology routing, and obviates the need for link virtualization (such as MPLS "forwarding adjacencies" as per RFC 4206) to artificially drive up the mesh density, which is done in prior load balancing systems. For the two stage sort, the timing of when the link bias is applied matters. It is typically only considered for the second and subsequent iterations. In an implementation where in the first iteration, all equal cost paths were tied for utilization (zero), applying the bias factor immediately would tend to shift all load away from that link with the bias toward the other paths resulting from the first iteration.

Figure 2:
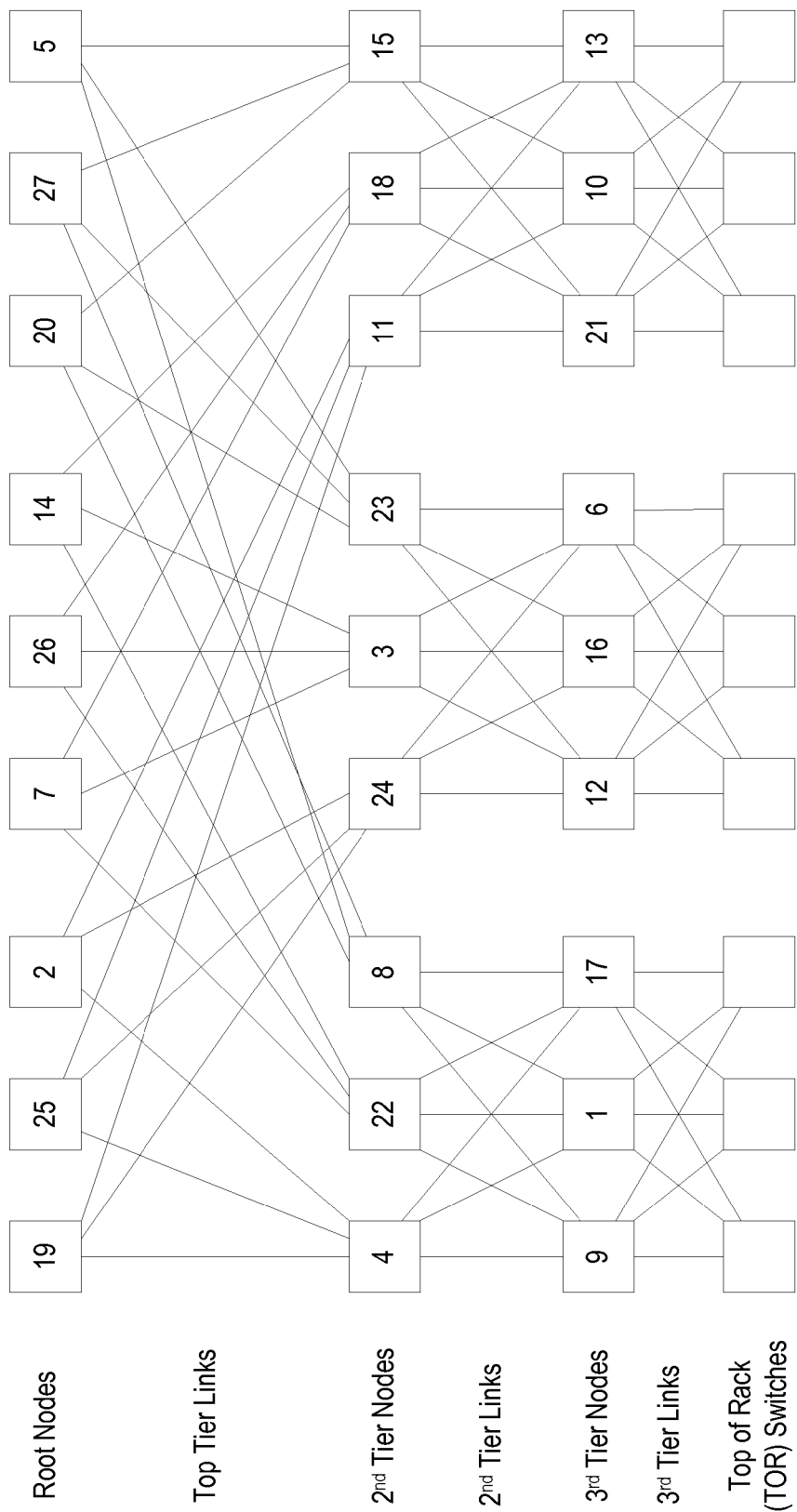
FIG. 2 illustrates an exemplary fat tree network topology according to an embodiment.

FIG. 2 illustrates an exemplary fat tree network topology according to an embodiment. As detailed earlier, one common use of fat tree networks is in the data center space. This example is of a generalized fat tree (GFT) having a height of 3, with 3 children per node, and 3 parents per node (GFT(3, 3,3)). In this illustration there are nine (9) root nodes (19, 25, 2, 7, 26, 14, 20, 27, and 5), nine (9) second nodes (4, 22, 8, 24, 3, 23, 11, 18, and 15), and nine (9) third tier nodes (9, 1, 17, 12, 16, 6, 21, 10, and 13). Between the root nodes and second tier nodes is a collection of top tier links. Similarly, between the second tier nodes is a collection of second tier links. The third tier nodes couple to top of rack (TOR) switches. Each level of this fat tree is made of up clusters of three nodes. For example, the root tier has clusters (19, 25, 2), (7, 26, 14), and (20, 27, 5).

In this example, and in the corresponding topology, roots are distinct in that a tree for a spanning tree from one root that completely reaches all edges in such a network hierarchy does not transit another root. The creation of the topology uses a Dijkstra algorithm in computing a rooted tree, and when this algorithm encounters another root that path is pruned. In some embodiments, if there is not a terminate or prune computation on transiting a root, then when a resulting tree for a given root has another root in it an "all pairs" shortest path solution will be utilized. For example, there are no roots in the topology that go from root node 19 to root node 25. Additionally, in some embodiments, a path that gets closer to a root is not included in the topology as are paths that never hit a leaf. In other words, nodes are only included in the topology if they validly transit root to leaf or leaf to leaf. Each of the nodes (root or leaf) has a MAC address that is a part of at least one filtering database (FDB). Leaves with a Service Instance identifier (I-SID) offer load to the topology.

Figure 3:
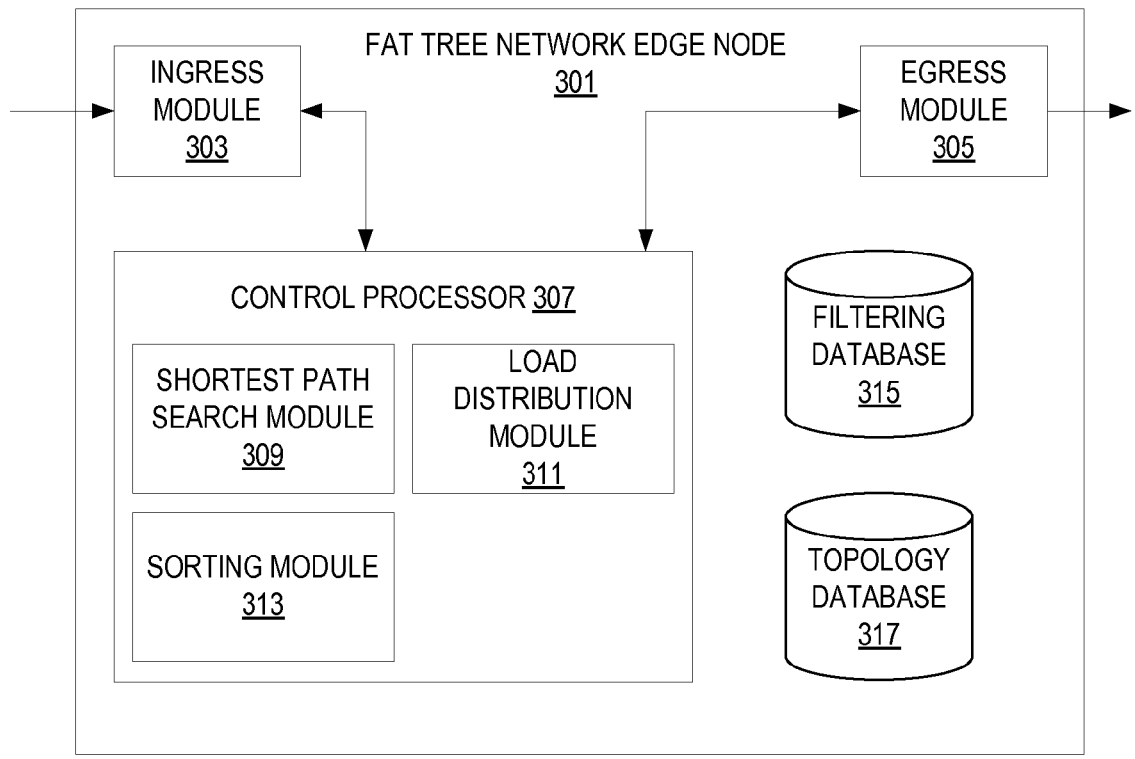
FIG. 3 is a diagram of one embodiment of a fat tree network node implementing load balancing, which is based upon the use of link utilization as feedback into the tie-breaking mechanism.

FIG. 3 is a diagram of one embodiment of a fat tree network node implementing load balancing, which is based upon the use of link utilization as feedback into the tie-breaking mechanism. In some embodiments, the fat tree network edge node 301 includes a filtering database (FDB) 315, a topology database 317, an ingress module 303, an egress module 305, and a control processor 307. The ingress module 303 handles the processing of data packets being received by the fat tree network edge node 301 at the physical link and data link level. The egress module 305 handles the processing of data packets being transmitted by the fat tree network node 301 at the physical link and data link level. The control processor 307 handles the routing, forwarding, and higher level processing of the data traffic. The control processor 307 may execute or include a shortest path search module 309, load distribution module 315, and sorting module 311.

The filtering database 315 includes a source address table with media access control (MAC) address, VLAN, and corresponding ports identifiers. This information is utilized by the control processor 307 to determine how a data packet is to be handled, i.e., which network interface the data packet should be forward unto.

The topology database 317 stores a network model or similar representation of the topology of the fat network with which the network element 301 is connected. The nodes can be identified with unique node identifiers such as nodal loopback addresses and the links with node-identifier pairs. One skilled in the art would understand that this network model representation is provided by way of example and that other representations of the network topology can be utilized with the load distribution method and system.

A shortest path search module 309 is a component of the control processor 307 or a module executed by the control processor 307. The shortest path search module 309 traverses the topology database 307 to determine the shortest path between any two nodes in the network topology. If there are multiple paths having an equal distance or cost in the network between two nodes and these multiple paths are all the shortest paths then these multiple equal cost paths are provided to the sorting module 311 and load distribution module 315 to determine which to utilize. The shortest path search module 309 can determine the shortest paths between all nodes in the network topology, both in the case of connectivity in the form of a spanning tree in which case the shortest paths are required to transit the root, or in the multiple tree scenario resulting from an "all pairs" computation.

The shortest path search module 309 provides a set of shortest paths for each node pair and the load distribution module 315 selects a subset of the shortest paths and updates the filtering database 315 to include an entry that implements the subset of each of the shortest paths that traverse the fat tree network node 301.

After the first pass, the shortest path search module 309 calculates the link utilization value for each link in the network topology resulting from the first pass through the topology database. The link utilization value is a count of the number of selected shortest paths that traverse a given link. A separate link utilization value is calculated and recorded for each link. These link utilization values are utilized to generate a path utilization value that in turn is used to bias the rankings of the paths for subsequent passes through the topology database 317 where the initial tiebreaker is either the ranked list of lexicographically sorted link utilization values or the sum of link utilization values (i.e., in the form of the path utilization value), and where this results in a tie, the common algorithm tie-breaking process is used as a subsequent tie breaker.

The sorting module 311 is a component of the control processor 307 or a module executed by the control processor 307. The sorting module 311 assists the load distribution module 315 by performing an initial ranking of the loaded set of equal cost trees based on the path utilization values in the second pass and in subsequent passes.

For each node pair with multiple equal cost paths, the sorting module 311 generates a ranking of each of these equal cost paths based on path utilization values and the load distribution module 315 selects at least one path from this ranking. In other embodiments, highest ranked and lowest ranked paths are selected to divide the load between the corresponding node pairs. The load distribution module 315 is a component of the control processor 307 or a module executed by the control processor 307.

This process can be repeated through any number of passes or iterations where the link utilization values are updated to be a cumulative indication of the set of shortest paths that transits it. In the case of a fat tree, the process is typically performed once per root. The path utilization values are also updated in line with the changes to the link utilization values. The useful artifact of this process is that the standard deviation in the variance in the paths typically diminishes with each iteration, but as the number of path sets goes up, the overall impact of each additional set is proportionately diminished, indicating that the use of more than two or three passes or iterations is not worth either the computational effort to produce or the forwarding state to instantiate. The number of passes or iterations is designated by an administrator and is configured network wide.

Figure 4:
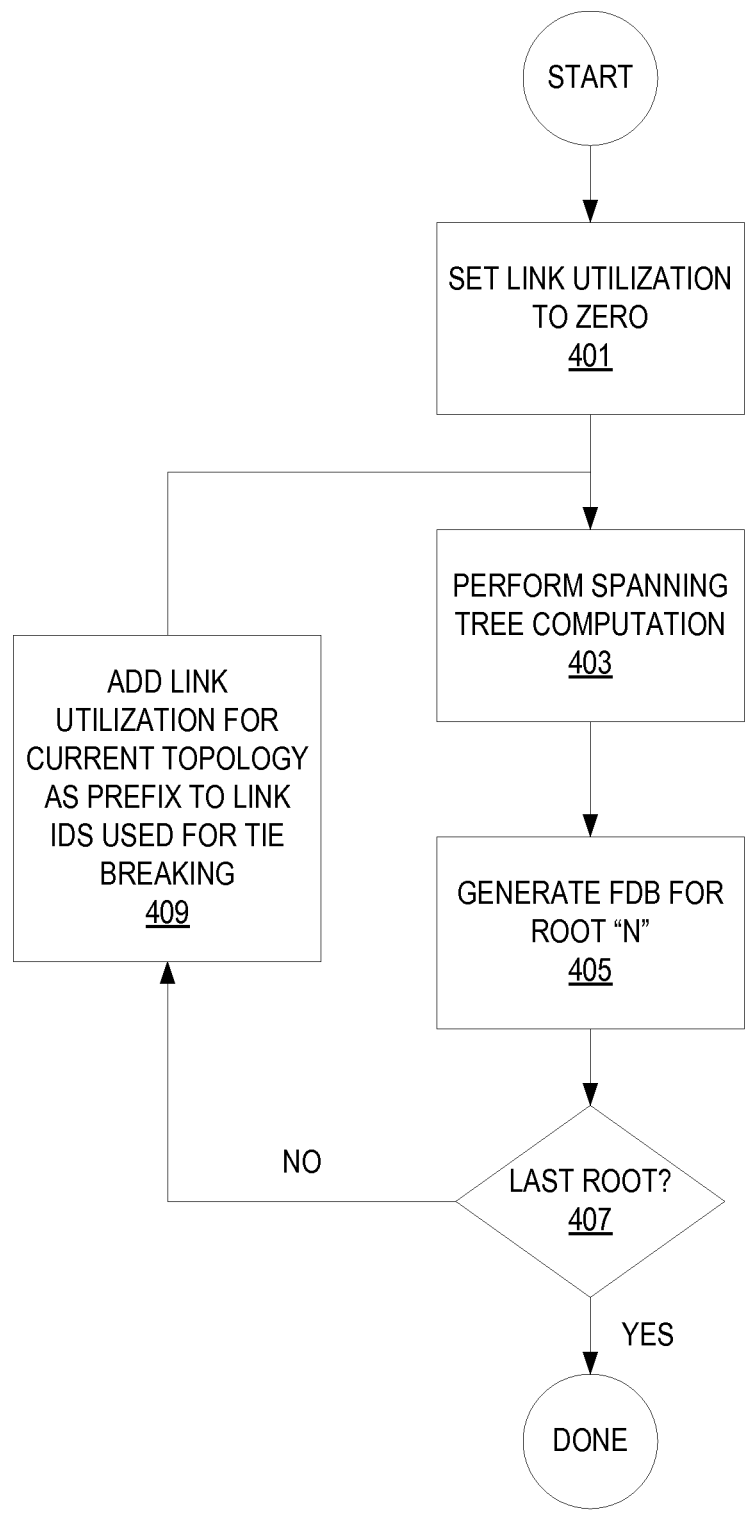
FIG. 4 illustrates an embodiment of a method for load distribution supporting automated network aware load spreading for a fat tree.

FIG. 4 illustrates an embodiment of a method for load distribution supporting automated network aware load spreading for a fat tree. At 401, the link utilization value is set to zero. As detailed earlier, this is the count of node pairs whose shortest path transits the link.

Spanning tree computation for a root node is performed at 403. As noted earlier, a tree from each available root is created utilizing a load assignment technique to ensure tree diversity. For all designated roots ranked in one embodiment from lowest to highest by nickname, a tree is computed and the load on each link is indicated. Any ranking mechanism that can be commonly implemented in all nodes can be substituted for nickname based ranking.

For ease of understanding, the examples in this description have the same load value. Spanning tree computation begins with the lowest ranked (numbered) root node. In the examples above, this node is root node 2.

Figure 5:
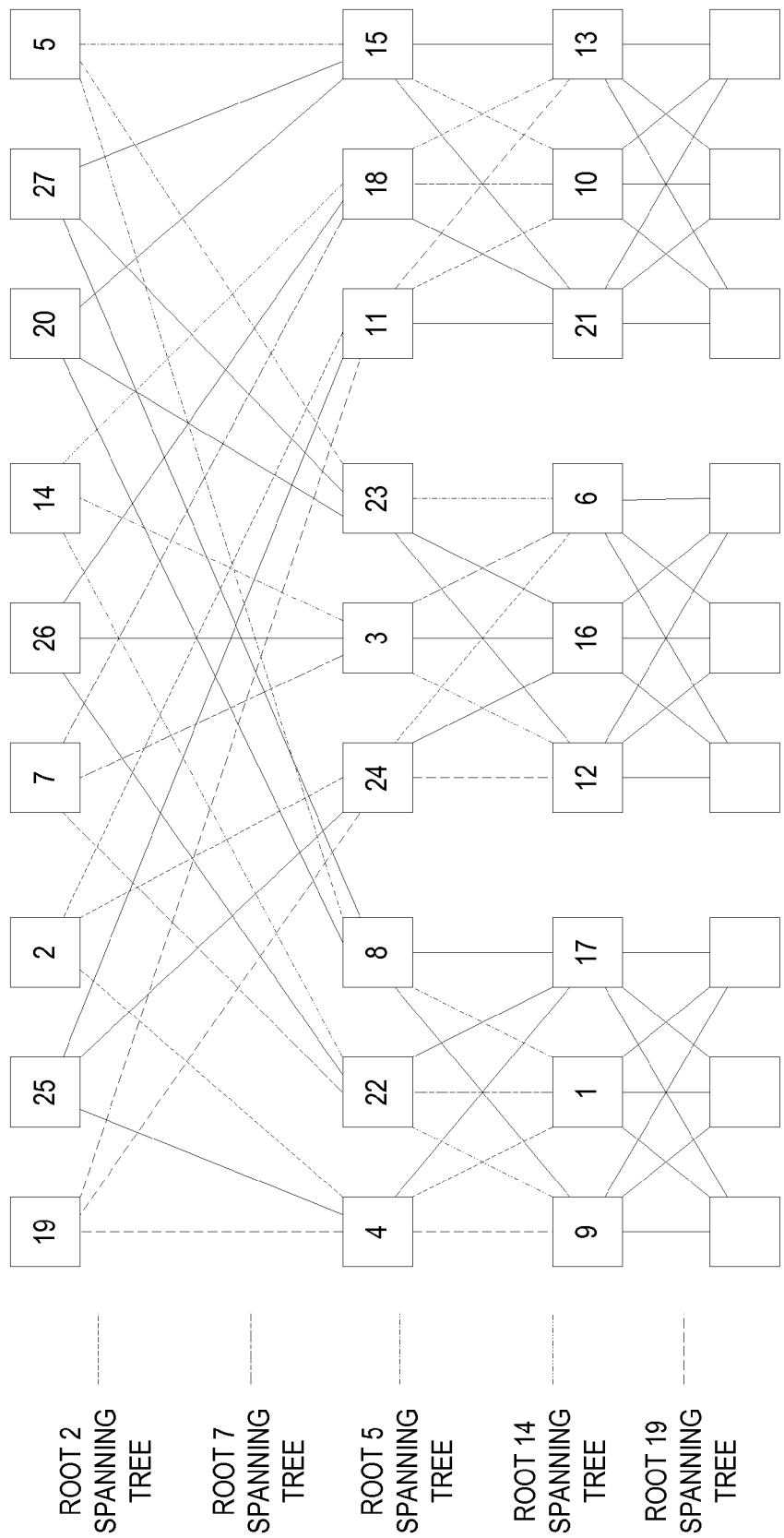
FIG. 5 illustrates an example of computed spanning trees.

FIG. 5 illustrates an example of computed spanning trees. These trees were computed in order beginning with the lowest numbered root node which in this instance is 2. Root node 5's spanning trees are computed next, etc. For root node 2, the first path that is a part of the tree is 2→4→1. Second tier node 4 is the lowest root node that root node 2 may access in the first cluster of the second tier. From second tier node 4, the lowest root node that it can read is third tier node 3. The second path for root node 2 is 2→24→6. The lowest numbered node that root node 2 may access in the second cluster is second tier node 24. From there, the lowest node in the third tier is 6. The final path for tier 2 to the third tier is 2→11→10. Unique paths to the TOR switches from nodes 1, 6 and 10 will complete the path set. These paths make up the spanning tree for rode node 2.

Similar trees are created for all of the other root nodes beginning with root node 5, however, as the number of paths that transit each link has been recorded from previous passes and plays into tie breaking of subsequent passes, paths that have already been used will be naturally avoided. In fact, in a regular Clos or Fat tree the number of links at a given level of the hierarchy will frequently correspond to the number of roots, hence so will the number of paths across the network. So each link will be used by exactly one tree in this scenario.

Figure 6:
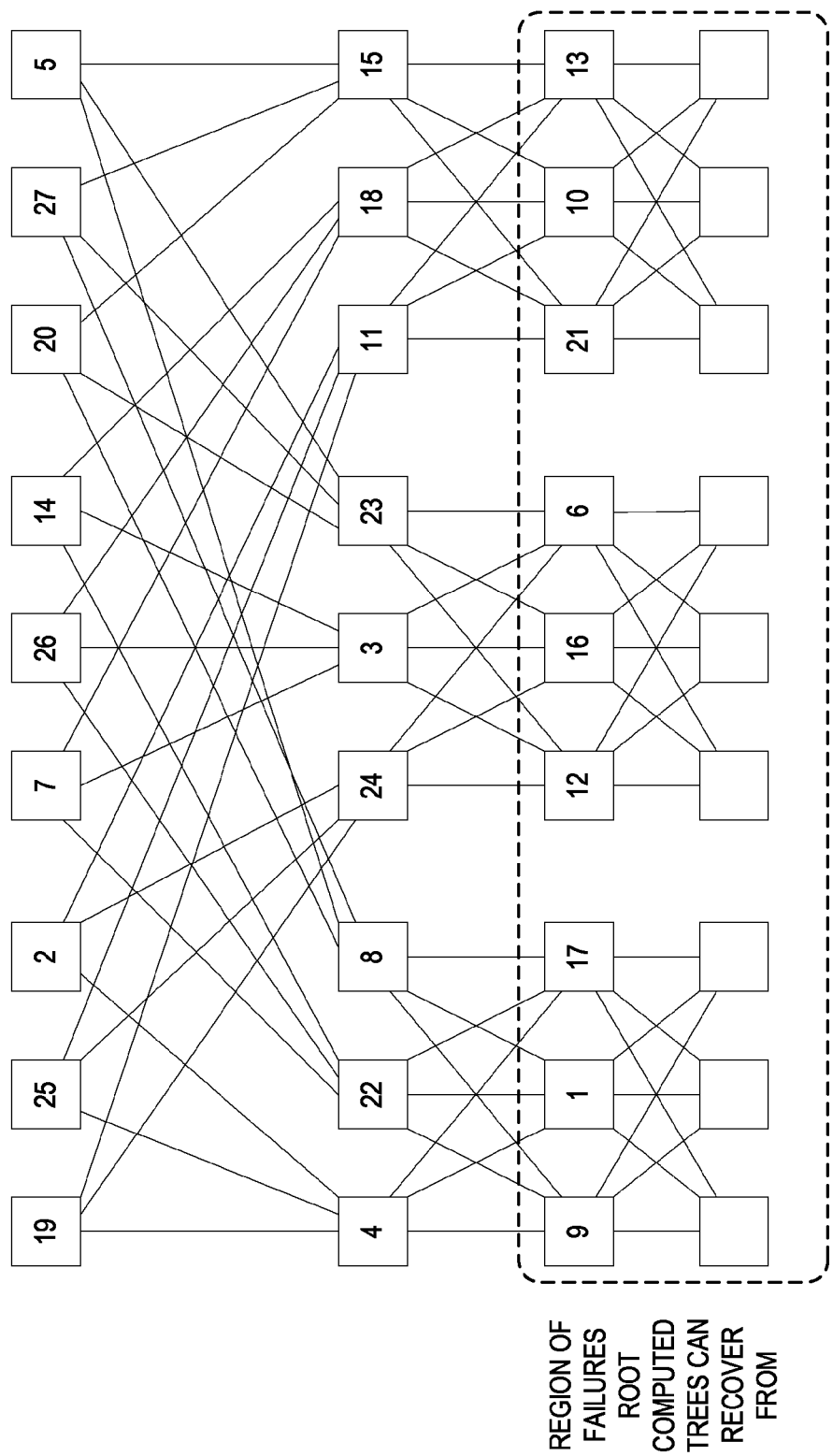
FIG. 6 illustrates a region in the fat tree that a root computed tree can recover from if there is a single failure according to an embodiment.

This simplistic model assumes that there are no failures in a so-called "critical zone," however, if there is a failure in this zone, then special rules apply. FIG. 6 illustrates a region in the fat tree that a root computed tree can recover from if there is a single failure according to an embodiment. Once a packet is past the second tier of switches, it is close enough to the leaves that the spanning tree should have taken care of any failures. For example, if node 9 fails, nodes 1 and 17 may be used to get to an endpoint in a cluster. For a fat tree, computing spanning trees from the root with weighting is the equivalent of all pairs shortest path with weighting for any failure in the region that a spanning tree is assumed to be able to recover from.

Figure 7:
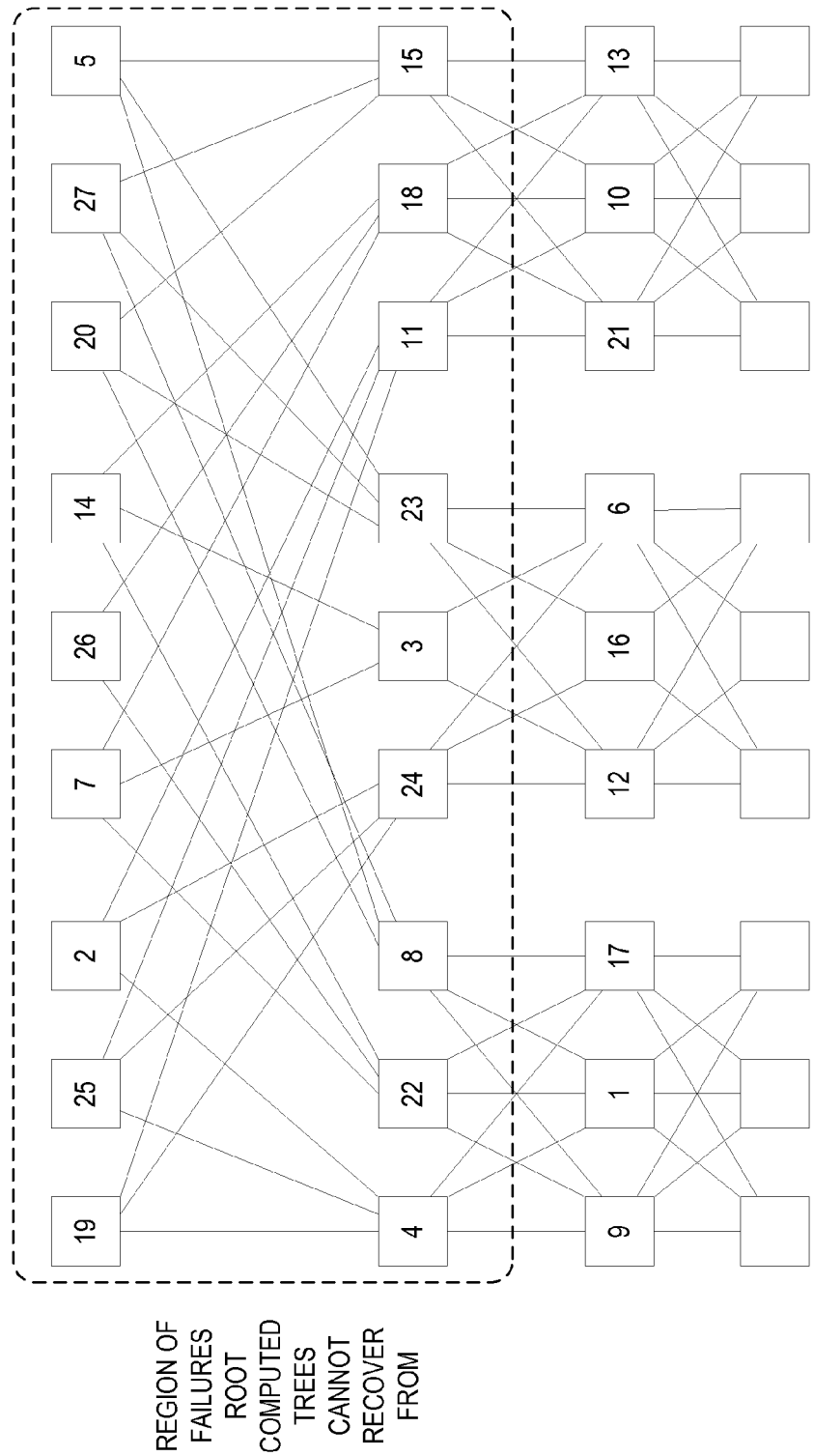
FIG. 7 illustrates a region in the fat tree that a root computed tree cannot recover from if there is a failure according to an embodiment.

FIG. 7 illustrates a region in the fat tree that a root computed tree cannot recover from if there is a failure according to an embodiment. The footprint of failures up the illustrated "critical zone" ripples through the entire network and cannot be isolated.

Figure 8:
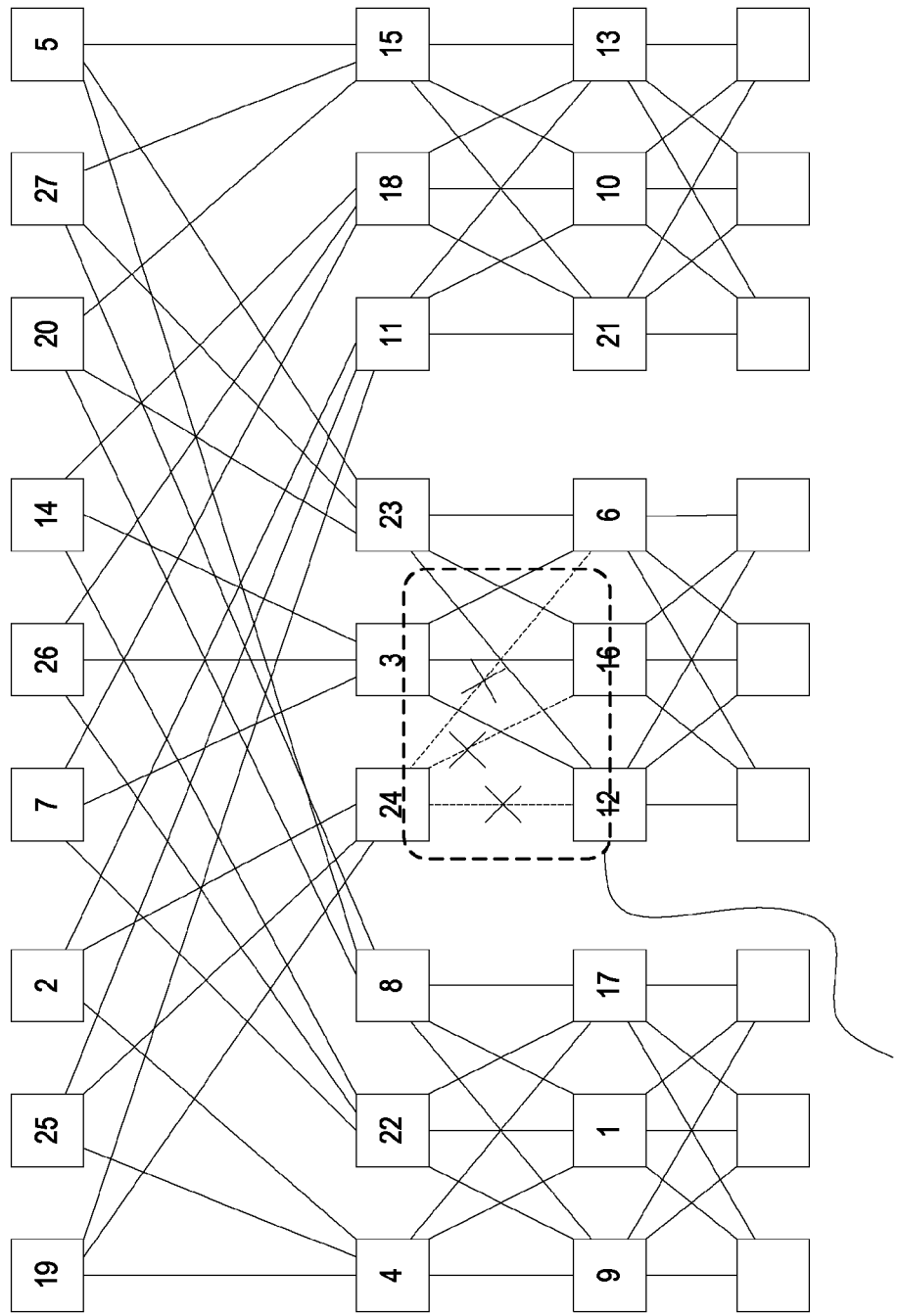
FIG. 8 illustrates a scenario where a number of failures collectively will sever a portion of the network from a given root.

FIG. 8 illustrates a scenario where a number of failures collectively will sever a portion of the network from a given root. In this case the failure of links 12-24, 16-24 and 6-24 (illustrated with dashed lines) severs a node (such as 12) from roots 2, 19 and 25. This is an example of another failure that a computed tree cannot recover from if the algorithm terminates when a root is encountered, and will be non-optimal connectivity if the algorithm is allowed to transit a root.

Figure 9:
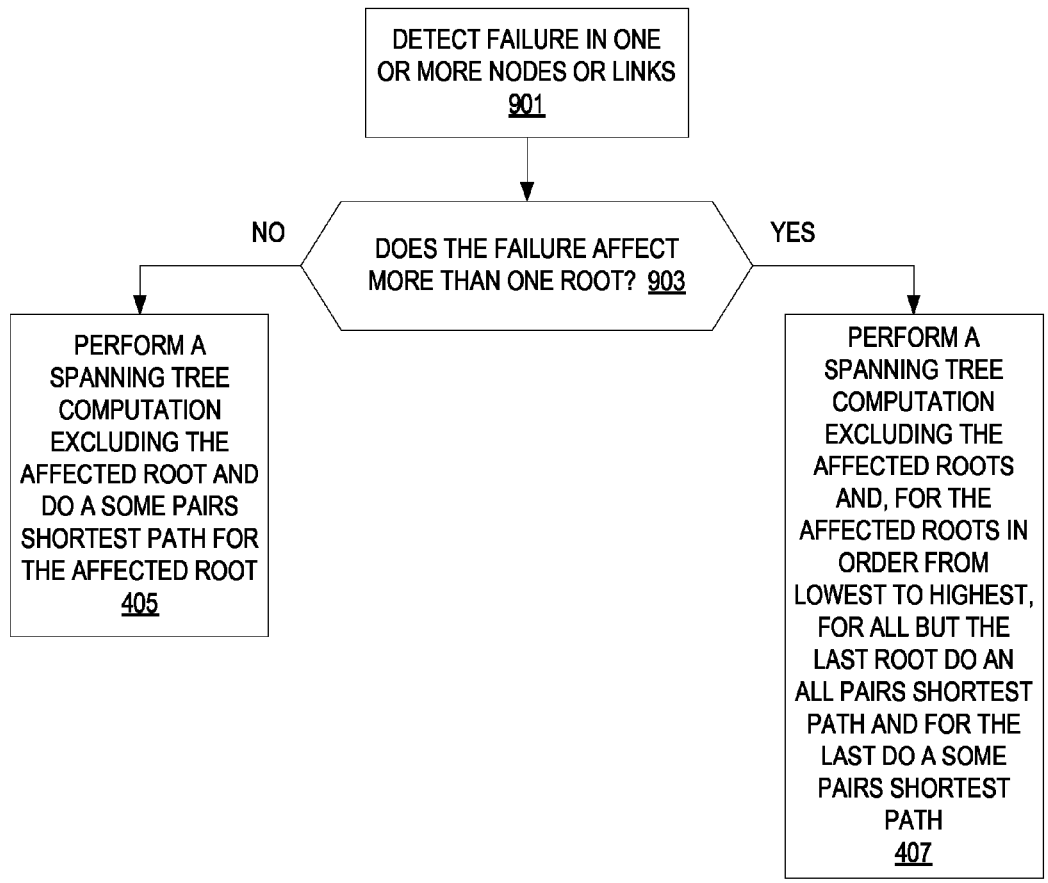
FIG. 9 illustrates an embodiment of a method of spanning tree computation upon detecting a failure.

FIG. 9 illustrates an embodiment of a method of spanning tree computation upon detecting a failure. The failure of one or more nodes or links is detected at 901. A determination of if the failure affects one or more roots is made at 903.

If a failure affects only one root, then spanning trees are generated for all of the roots, but for the affected root at 905. These spanning trees are "all pairs." For the affected root, a "some pairs" shortest path is created (generalized mesh with not all paths considered). This finds the next tree with the shortest path. For example, if node 19 is lost, to go from 9→10 the path is 9→22→7→18→10. Examples of single root failures include the loss of a root node (such as root node 19) or a loss of a top tier link or links associated with only one root node (such as 4→19, 24→19, or 11→19). In some embodiments, the affected node is known if the count of the roots is greater than the count of the number of processed roots.

If a failure affects multiple roots, then spanning trees are created excluding the affected roots at 907 and the affected roots are processed as follows. The affected roots are placed in order from lowest to highest. For all but the highest affected root, spanning trees using "all pairs" are created. For the highest affected root (the last root), a "some pairs" shortest path is created. In a "some pairs" calculation the entire set of paths for the root equivalent in the fat tree network are not considered (whereas they are for an "all pairs" calculation). Examples of multiple root failures include the loss of second tier node (such as node 4) or the failure links affecting multiple root nodes (such as the failure of lines 8→20 and 5→15 where root nodes 4 and 5 are both affected).

An FDB for the root node whose spanning tree was computed is generated at 405. In some embodiments, entries in a FDB include MAC addresses of the nodes in tree and port indications for those nodes/paths. The spanning tree itself may be stored in a topology database for the root node.

A determination of if this was the last root node is made at 407. If yes, then all of the roots have had their topology mapped (thereby creating a topology database) and FDB's created. If no, then link utilization for the current topology is added as a prefix to link identifiers used for tie breaking at 409. The use of link utilization has been previously detailed.

A different embodiment that does not explicitly optimize computation, but does minimize the perturbation of any link failures on the network is as follows. The roots are ranked and processed in order. Where a failure is known to have occurred in the region a spanning tree cannot recover from OR a spanning tree is determined to transit another root, an "all pairs" computation is substituted for the spanning tree computation prior to proceeding to the next root. The reason this minimizes perturbation on the network is that the order of application of load in unaffected parts of the network will not be disturbed, hence a minimal rearrangement of the traffic matrix occurs. Only of an all pairs computation is required for the last root in the ranking can some optimization of the required computing be applied.

Figure 10:
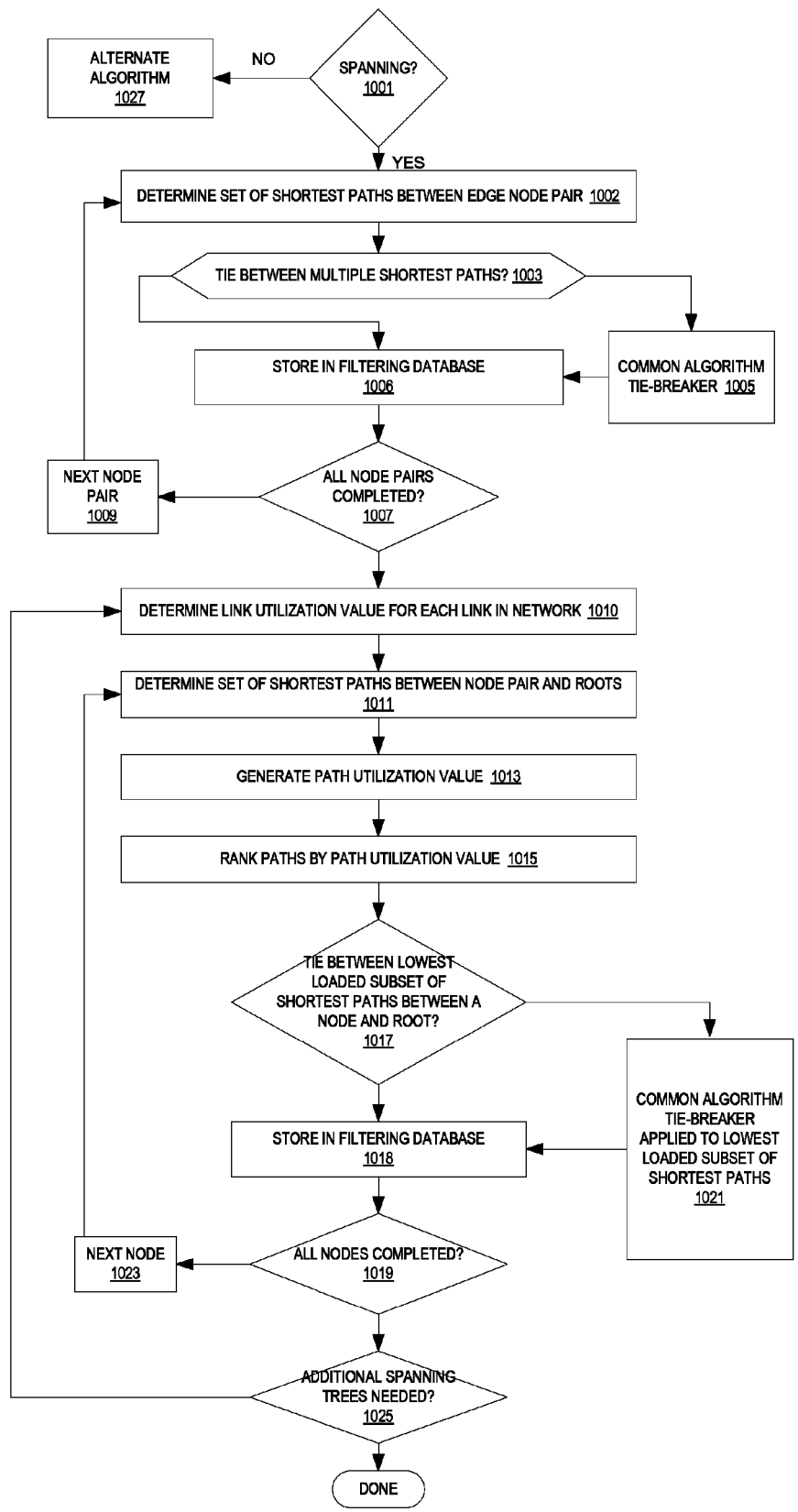
FIG. 10 illustrates an embodiment of a method for load distribution enabling automated network aware load spreading based upon the use of link utilization as feedback into the tie-breaking mechanism for equal cost paths in a fat tree network.

FIG. 10 illustrates an embodiment of a method for load distribution enabling automated network aware load spreading based upon the use of link utilization as feedback into the tie-breaking mechanism for equal cost paths in a fat tree network. In one embodiment, the method may be run at the initiation of a fat tree network node such as a fat tree node, upon notification of a change in topology to the fat tree network connected to that node, at defined intervals, or at similar events or times. In some embodiments, a topology database is maintained at each node in the fat tree network as a separate method from the load distribution method and is assumed to be a current representation of the true topology of the fat tree network.

In one embodiment, this method begins with a determination of if a spanning tree should be created or not at 1001. As detailed earlier, spanning trees are created when there are no failures in the fat tree network. Depending on the failure(s), an alternative algorithm may be utilized for a particular root as detailed above.

At 1002, a determination of a set of shortest paths between an edge node in the fat tree network and another edge node in the fat tree network at 1002. The set of shortest paths is the individual paths or set of trees with each edge node as a root of its respective tree. A check is made to determine whether there are multiple shortest paths, that is, there is a tie for shortest path between the edge nodes at 1003. If the edge node pair has a single shortest path between them, the filtering database is updated to reflect the shortest path at 1006. In one embodiment, the filtering database is updated to reflect each of the paths that traverse the edge node that maintains it. Each edge node in the fat tree network performs this same calculation. The load distribution method is deterministic and thus each edge node will compute the same result. Further processing of those edge node pairs with a single shortest path is typically unnecessary unless there is a change in topology.

If the edge node pair does not have a unique shortest path typically measured as the lowest number of hops and lowest cost then the common algorithm tie-breaking method is used to permit a unique shortest path or set of shortest paths to be selected at 1005. After the paths are selected they are stored in the filtering database or utilized to update the filtering database, such that all the edge node pairs have at least one path between them selected.

After the shortest path is selected, a check is made to determine whether all of the node pairs have had a path selected at 1007. If further node pairs have not had a path or set of paths selected, then the method continues by selecting the next node pair to method at 1009. If all of the node pairs have had a shortest path selected, then the method continues to a second pass or iteration.

The link utilization value for each link is calculated either as a consequence of or after the update of the filtering database for all edge node pairs has completed at 310. The link utilization value is a count of the number of the paths that traverse each corresponding link in a topology of the fat tree network. A link utilization value is calculated for each link in the fat tree network. The link utilization value provides an indication of the level of usage and potential bottlenecks in the fat tree network that should be avoided if additional paths are to be formed.

For subsequent generation of shortest paths, tie-breaking is initially performed by generating path utilization values either as the lexicographically sorted list where the path utilization values include the link utilization values or the sum of the link utilization values. The all nodes method begins again by selecting a node and determining a set of shortest paths between the node pair and the root at 1011. This method includes path utilization values based on the link utilization values that correspond to each path at 1013. The path utilization values can represent the overall load of each path, such as a sum of the link utilization values or can be a lexicographically sorted arrangement of the link utilization values highlighting the most or least loaded links in each path or similar arrangements and representations. The shortest paths are ranked by their path utilization value at 1015. A check is made to determine whether there is more than one shortest path between a node and the root having equal path utilization values at 1017. It should be noted that although tie breaking is applied to spanning tree between a node and the root, in one embodiment the actual link utilization count needs to consider all node pairs (as not all node-to-node connectivity transits a root) such that a proper comparison count exists for link utilization when both spanning tree and all pairs shortest path operation is used together.

Where a uniquely lowest loaded path exists it can be selected without further processing for all path rankings. When there is more than one shortest path of identical loading (i.e., identical path utilization values), the common algorithm tie-breaking method is then used to perform path selection in this subset of lowest loaded set of shortest paths at 1021. The ranking takes into account the link utilization value such that those paths with the lowest or the least used links, are the most likely to be selected, which takes into account the overall load of the fat tree network and not just a next hop in the fat tree network as a result, the routing throughout the fat tree network is more balanced. The filtering database is then updated to reflect the selected paths at 1018.

A check is then made to determine whether all of the nodes have a selected shortest path or set of shortest paths to the root at 1019. If not, then the method continues by selecting the next node to method at 1023. If the all of the nodes have been calculated, then a check is made to determine whether additional spanning trees are needed at 1025. This is normally automated via the root designation process (a spanning tree per root being normal operation). If no additional spanning trees are needed (this may be a parameter that is set by a fat tree network administrator or similarly determined), then the load distribution method ends. If additional spanning trees are needed, then the method continues with additional passes that is similar to the second, but builds on the link utilization determined in previous iterations. This method can have any number of iterations.

As should be apparent, embodiments of the above architecture are optimized around the top tier of switching. Losing any portion of top tier connectivity severs some portion of the network for that root. New roots are not simply elected when some portion of the top tier connectivity is lost. Preferably, the load is sub-divided further. Topology, etc. may be recalculated upon the loss of connectivity of nodes.

One of the advantages of embodiments of the invention is that for a network of M nodes with N top level nodes (such that N<<M) it reduces the computational complexity from $NM^2 \log M$ to $NM \log M$, and in the case of a root failure the complexity becomes $(N-1)M \log M + M^2 \log M$ as the unfailed roots are computed as spanning trees and the failed root is computed as a generalized mesh solution.

Thus, a method, system and apparatus for load distribution in a fat tree network that takes into account link usage have been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method implemented in at least one fat tree network node for improved load distribution, wherein the node is one of a plurality of fat tree network nodes in a fat tree network each of which implement a tie-breaking process to produce minimum cost trees, the method comprising the steps of:
performing a spanning tree computation for each root node of the fat tree network in order from a lowest ranked root node to a highest ranked node by,
determining if there are at least one failure affecting one root node of the fat tree network,
if there are no failures, calculating spanning trees for all of the roots to generate the trees,
if there is only one failure,
calculating spanning trees for all of the roots excluding the affected root from lowest ranked to highest ranked to generate the trees for the unaffected roots, and
for the affected root, performing a some pairs calculation, and
if there is more than one failure,
calculating spanning trees for all of the roots excluding the affected roots from lowest ranked to highest ranked to generate the trees for the unaffected roots, and
for the affected roots, performing an all pairs calculation for all but the highest ranked affected root in order from lowest to highest ranked, and performing a some pairs calculation for the highest ranked affected root;
generating a filtering database for each root node of the fat tree network, wherein the filtering database includes a set of media access control (MAC) addresses of the leaf nodes of the fat tree network; and
adding link utilization for each computed tree to use as a prefix to link identifiers used for at least one tie-breaking algorithm.

2. The method of claim 1, wherein the computed trees do not transit another.

3. The method of claim 1, wherein the fat tree network is a datacenter.

4. A method in an edge node for improved load distribution in an fat tree network that includes the edge node, wherein the edge node is one of a plurality of edge nodes in the fat tree network each of which implement a common algorithm tie-breaking process to produce minimum cost spanning trees, the edge node includes a database to store the topology of the fat tree network, wherein the topology of the fat tree network includes a plurality of nodes and links between the nodes, the method comprising the steps of:

determining a first set of one or more shortest paths between each edge node pair in the fat tree network by executing a shortest path search algorithm on the topology of the fat tree network stored in the database;

selecting at least a first shortest path from the first set of shortest paths for each edge node pair, wherein when there is only one shortest path that path is selected as the first shortest path and when there is a tie for the shortest path the selection of the first shortest path is made using a tie breaking process;

storing at least the first shortest path for each edge node pair in a filtering database, wherein the filtering database indicates where to forward traffic incoming to the edge node;

calculating a link utilization value for each link of the fat tree network by counting previously selected shortest paths that transit each link;

for each root, determining a second set of one or more shortest paths between each edge node pair of the fat tree network by executing the shortest path search algorithm on the topology of the fat tree network stored in the database, wherein the one or more shortest paths includes the root;

generating a path utilization value for each shortest path in the second set of one or more shortest paths based on the previously calculated link utilization values corresponding to each shortest path;

selecting a second shortest path for each edge node pair from the second set of one or more shortest path on the basis of said path utilization value, wherein the selecting utilizes a tie-breaking process when multiple shortest paths having equal path utilization values are present in the set of one or more shortest paths and the selecting does not use a tie-breaking process when there is only one shortest path based on utilization values; and storing the second shortest path for each edge node pair in the filtering database.

5. The method of claim 4, wherein said step of generating said path utilization value comprises:

summing link utilization values corresponding to each path, or lexicographically sorting the link utilization values corresponding to each path.

6. The method of claim 4, further comprising the steps of:
receiving a link modification factor from an administrator; and combining the link modification factor with the link utilization value to weight a corresponding one of the links and paths to decrease usage of the link by decreasing a likelihood of selection by affecting the ranking of the set of lowest loaded path.

7. The method of claim 4, further comprising the steps of:
iteratively selecting additional shortest paths to share load distribution with the first shortest path and second shortest path until an administered number of paths reflecting a network operators desire for overall improvement for the fat tree network is met.

8. The method claim 4, wherein the sets of shortest paths between edge node pairs are each implemented as virtual local area networks (VLANs) within the fat tree network.

9. An edge node for improved load distribution in an fat tree network that includes the edge node, wherein the edge node is one of a plurality of edge nodes in the fat tree network, wherein a topology of the fat tree network includes a plurality of nodes and links between the nodes, the edge node comprising:

a topology database to store link information for each link in the fat tree network;

a filtering database to store filtering information for each port of the edge node, wherein the filtering database indicates where to forward traffic incoming to the edge node;

a control processor coupled to the topology database and the filtering database, the control processor configured to process data traffic, wherein the control processor comprises:

a shortest path search module configured to determine at least one shortest path between each edge node pair in the fat tree network by executing a shortest path search algorithm on the topology database, wherein the shortest path search module is configured to send, for each of the edge node pairs with a plurality of equal cost shortest paths, the equal costs shortest paths to a load distribution module and a sorting module;

the sorting module configured to rank each of the plurality of equal cost shortest paths based on a path utilization value derived from link utilization values which are counts of previously selected shortest paths that transit each link associated with each path in the plurality of equal cost shortest paths; and the load distribution module configured to select, from the plurality of equal cost shortest paths, a first subset of the plurality of equal cost shortest paths for that this edge node wherein the shortest path includes a root of the tree to be used to share data traffic load between the edge node pair and to select, based on the path utilization value, a second subset from the plurality of equal cost shortest paths for this edge node wherein the shortest path includes a root of the tree to be used to share data traffic load with the first subset.

10. The edge node of claim 9, wherein the sorting module is further configured to sort the link utilization values lexicographically to create a ranking of the plurality of equal cost shortest paths.

11. The edge node of claim 9, wherein the shortest path search module is further configured to calculate the link utilization value for each link in the topology.

12. The edge node of claim 9, wherein the control processor generates virtual local area networks (VLANs) to implement each selected shortest paths between edge node pairs within the fat tree network.

13. The edge node of claim 9, wherein the load distribution module is further configured to receiving a link modification factor from an administrator and combine the link modification factor with a corresponding link utilization value to weight a corresponding link and path to decrease usage of the link by decreasing a likelihood of selection by affecting the lexicographical sorting.

14. The edge node of claim 9, wherein the sorting module and load distribution module are further configured to iteratively select additional subsets to share load distribution with the first subset and second subset.

* * * * *

UNITED STATES PATENT AND TRADEMARK OFFICE
CERTIFICATE OF CORRECTION

PATENT NO. : 9,210,071 B2  
APPLICATION NO. : 12/983009  
DATED : December 8, 2015  
INVENTOR(S) : Allan et al.

Page 1 of 1

It is certified that error appears in the above-identified patent and that said Letters Patent is hereby corrected as shown below:

On the title page item (74), delete "Elliott LLP" and insert -- Elliott, LLP --, therefor.

In the claims

Column 15, Line 61, Claim 8, delete "method claim" and insert -- method of claim --, therefor.

Signed and Sealed this  
Twenty-ninth Day of March, 2016

Michelle K. Lee  
*Director of the United States Patent and Trademark Office*